United States Patent
Rahmes et al.

(10) Patent No.: US 7,616,828 B2
(45) Date of Patent: Nov. 10, 2009

(54) GEOSPATIAL MODELING SYSTEM PROVIDING GEOSPATIAL MODEL DATA TARGET POINT FILTERING BASED UPON RADIAL LINE SEGMENTS AND RELATED METHODS

(75) Inventors: Mark Rahmes, Melbourne, FL (US);
Harlan Yates, Melbourne, FL (US);
Stephen Connetti, Melbourne, FL (US);
Anthony O'Neil Smith, Gainesville, FL (US)

(73) Assignee: Harris Corporation, Melbourne, FL (US)

( * ) Notice: Subject to any disclaimer, the term of this patent is extended or adjusted under 35 U.S.C. 154(b) by 732 days.

(21) Appl. No.: 11/458,823

(22) Filed: Jul. 20, 2006

(65) Prior Publication Data

US 2008/0019603 A1    Jan. 24, 2008

(51) Int. Cl.
G06K 9/40 (2006.01)
G06K 9/00 (2006.01)
G06K 9/54 (2006.01)
G06F 7/00 (2006.01)
G06F 7/60 (2006.01)

(52) U.S. Cl. .................. 382/260; 382/109; 382/305; 703/2; 707/1

(58) Field of Classification Search ............ 382/103, 382/109, 173, 260, 305; 706/58; 707/1; 703/2
See application file for complete search history.

(56) References Cited

U.S. PATENT DOCUMENTS

| | | | |
|---|---|---|---|
| 6,654,690 B2 | 11/2003 | Rahmes et al. ........... 702/5 |
| 6,987,520 B2 | 1/2006 | Criminisi et al. ......... 345/629 |
| 7,098,915 B2 * | 8/2006 | Appolloni ................ 345/427 |
| 7,120,620 B2 * | 10/2006 | Dumas et al. ............. 706/58 |
| 7,346,597 B2 * | 3/2008 | Dumas .................... 706/58 |
| 2004/0153128 A1 | 8/2004 | Suresh et al. ............. 607/14 |
| 2006/0013442 A1 | 1/2006 | McDowall et al. ....... 382/109 |
| 2006/0013443 A1 | 1/2006 | McDowall et al. ....... 382/109 |

OTHER PUBLICATIONS

Liang-Chien Chen et al., "Building Reconstruction From LIDAR Data and Aerial Imagery" Geoscience And Remote Sensing Symposium, 2005, IGARSS '05, Proceedings, 2005 IEEE International Seoul, Korea Jul. 25-29, 2005, Piscataway, NJ, IEEE, vol. 4, Jul. 25, 2005, pp. 2846-2849.

Oliver Wang et al., "A Bayesian Approach 1-10 to Building Footprint Extraction From Aerial LIDAR Data" 3D Data Processing, Visualization, and Transmission, Third International Symposium On, IEEE, PI, Jun. 1, 2006, pp. 192-199.

Bruzzone et al., *Recognition and Detection of Impact Craters from EO Products*, Department of Information and Communication Technology—University of Trento, 2004.

(Continued)

*Primary Examiner*—Kanji Patel
(74) *Attorney, Agent, or Firm*—Allen, Dyer, Doppelt, Milbrath & Gilchrist, P.A.

(57) ABSTRACT

A geospatial modeling system may include a geospatial model database and a processor cooperating therewith for filtering geospatial model data. This may be done by selectively updating a target point based upon adjacent points lying along a plurality of radial line segments extending outwardly from the at least one target point.

26 Claims, 12 Drawing Sheets

OTHER PUBLICATIONS

Vozikis, *Automated Generation and Updating of Digital City Models Using High-Resolution Line Scanning Systems*, 2004, International Archives of Photogrammetry, Remote Sensing and Spatial Information Sciences, vol. 35.

Maire et al., *Synergy of Image and Digital Elevation Models (DEMs) Information for Virtual Reality*, DLR German Aerospace Center.

Fisher et al, *Roberts Cross Edge Detector*, 1993, available at www.homepages.inf.ed.ac.uk/rbf/HIPR2/roberts.htm.

Fisher et al., *Hough Transform*, 1993, available at www.homepages.inf.ed.ac.uk/rbf/HIPR2/hough.htm.

Verdera et al., *Inpainting Surface Holes*, May 2, 2003.

Bertalmio et al. *Navier-Stokes, Fluid Dynamics, and Image and Video Inpainting*, Proceedings of the International Conference on Computer Vision and Pattern Recognition IEEE, 2001, vol. 1, pp. 355-362.

Reigber et al, *Interference Suppression in Synthesized SAR Images*, IEEE Geoscience and Remote Sensing Letters, vol. 2, No. 1, pp. 45-49, Jan. 2005.

Generating Contour Lines from 7.5 Min DEM Files, available at www.gis.usu.edu/Geography-Department/rsgis/howto/demgen/demgen.html.

Limp, *Raster GIS Packages Finally Receive Well-Deserved Recognition*, Geoworld, 2006.

\* cited by examiner

Radial_line (7, *)

Radial_line (6, *)

Radial_line (6, 5)
Radial_line (6, 4)
Radial_line (6, 3)
Radial_line (6, 2)
Radial_line (6, 1)

Radial_line (8, *)

Radial_line (5, *)

Radial_line (1, *)

Radial_line (4, *)

Radial_line (2, *)

Radial_line (3, *)

FIG. 9

GEOSPATIAL MODELING SYSTEM PROVIDING GEOSPATIAL MODEL DATA TARGET POINT FILTERING BASED UPON RADIAL LINE SEGMENTS AND RELATED METHODS

FIELD OF THE INVENTION

The present invention relates to the field of topography, and, more particularly, to a system and related methods for generating topographical models.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR).

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

While it is desirable to process a DEM so that the transitions between terrain, foliage, and cultural features (e.g., buildings) appear as smooth and as seamless as possible, excessive smoothing of a DEM also reduces the accuracy of the features in the image. For example, some of the feature obscurations that my occur include buildings beginning to look like flattened hills, hipped roofs appearing as flat, and trees beginning to look like domes. Moreover, the resolution of DEMs continues to get better, with resolutions of greater than one meter now being possible. Yet, higher resolutions typically result in more noise being present in the image particularly adjacent boundary regions between features, which exacerbates this problem.

Also, it is often desirable to smooth some features but not others. For example, it is desirable to smooth a building roof that appears uneven due to noisy input data. Yet, it is also desirable to maintain the discontinuities of foliage so that it maintains a natural appearance. Accordingly, in certain applications it may be desirable to provide enhanced geospatial model data feature distinguishing and filtering (i.e., smoothing) capabilities.

SUMMARY OF THE INVENTION

In view of the foregoing background, it is therefore an object of the present invention to provide a geospatial modeling system and related methods for enhanced filtering of geospatial model data.

This and other objects, features, and advantages are provided by a geospatial modeling system which may include a geospatial model database and a processor cooperating therewith for filtering geospatial model data. This may be done by selectively updating a target point based upon adjacent points lying along a plurality of radial line segments extending outwardly from the at least one target point.

More particularly, the processor may determine a linearity of each radial line segment. The processor does not update the at least one target point if the linearity of each radial line segment is below a linearity threshold. Additionally, each radial line segment may include a pair of end points and at least one intermediate point therebetween. Thus, the processor may determine the linearity of each line segment based upon a difference between the at least one intermediate point and a line connecting the end points.

The processor may also determine a projected update position for the at least one target point based upon an extrapolation of at least one linear radial line segment. Furthermore, the processor may update the target point to the projected update position if a first difference between the target point and the projected update position is less than a first threshold. More specifically, the processor may update the target point to the projected update position if the first difference is greater than the first threshold, and if a ratio of a second difference between an opposite point from the at least one radial line segment and the projected update position and the first difference is above a second threshold.

The plurality of radial line segments may be eight in number. Furthermore, each radial line segment may include N points wherein N is greater than or equal to three. Also, the geospatial model data may be a digital elevation model (DEM) having a resolution of greater than about one meter.

A geospatial modeling method aspect may include providing geospatial model data, and filtering the geospatial model data. More particularly, this may be done by using a processor to selectively update a target point based upon adjacent points lying along a plurality of radial line segments extending outwardly from the at least one target point.

BRIEF DESCRIPTION OF THE DRAWINGS

FIGS. 9-12 are a series of illustrations demonstrating the radial line segment filtering approach used for filtering the data in FIGS. 7-8.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
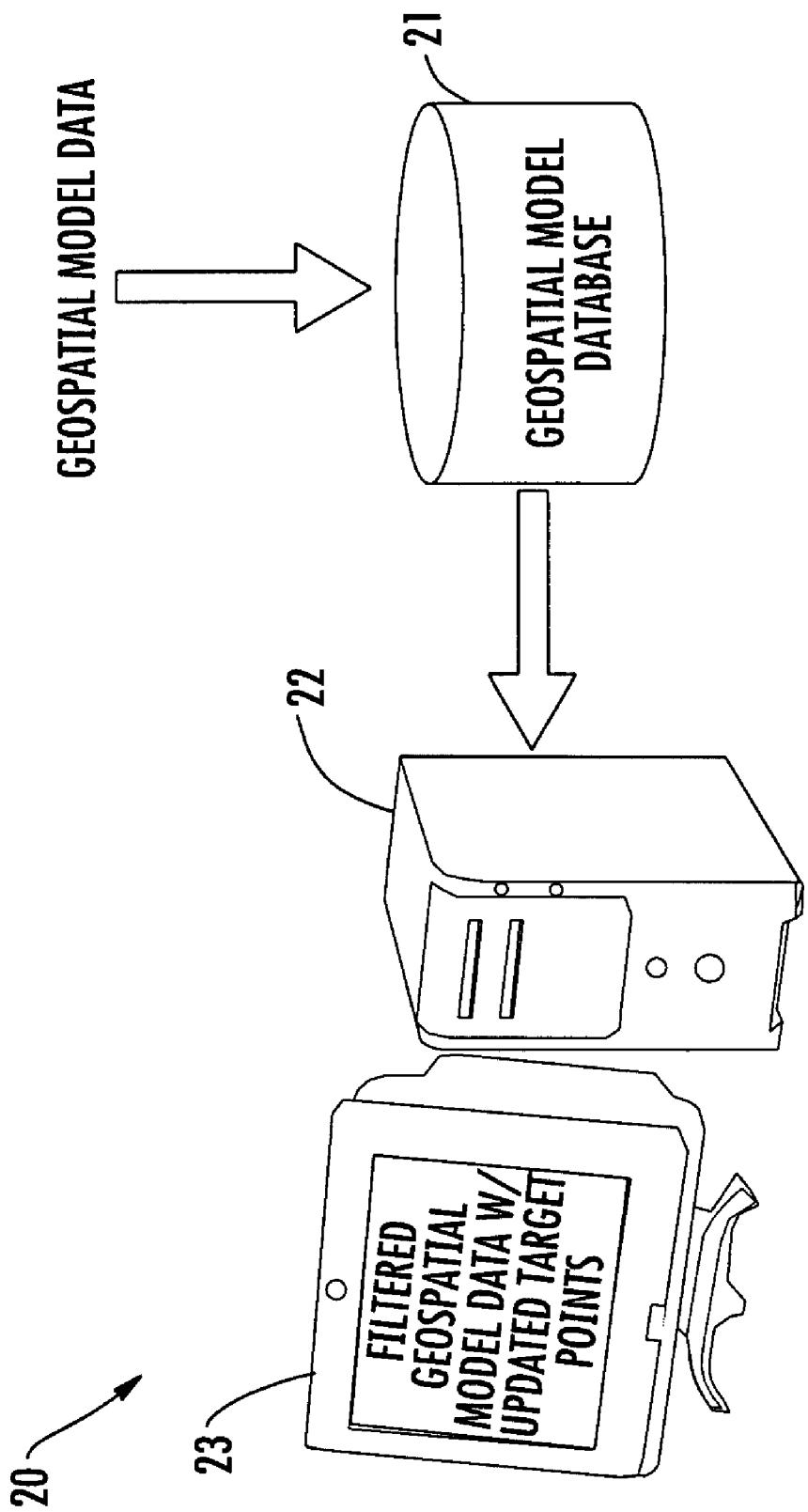
FIG. 1 is a schematic block diagram of a geospatial modeling system in accordance with the invention.
Figure 2:
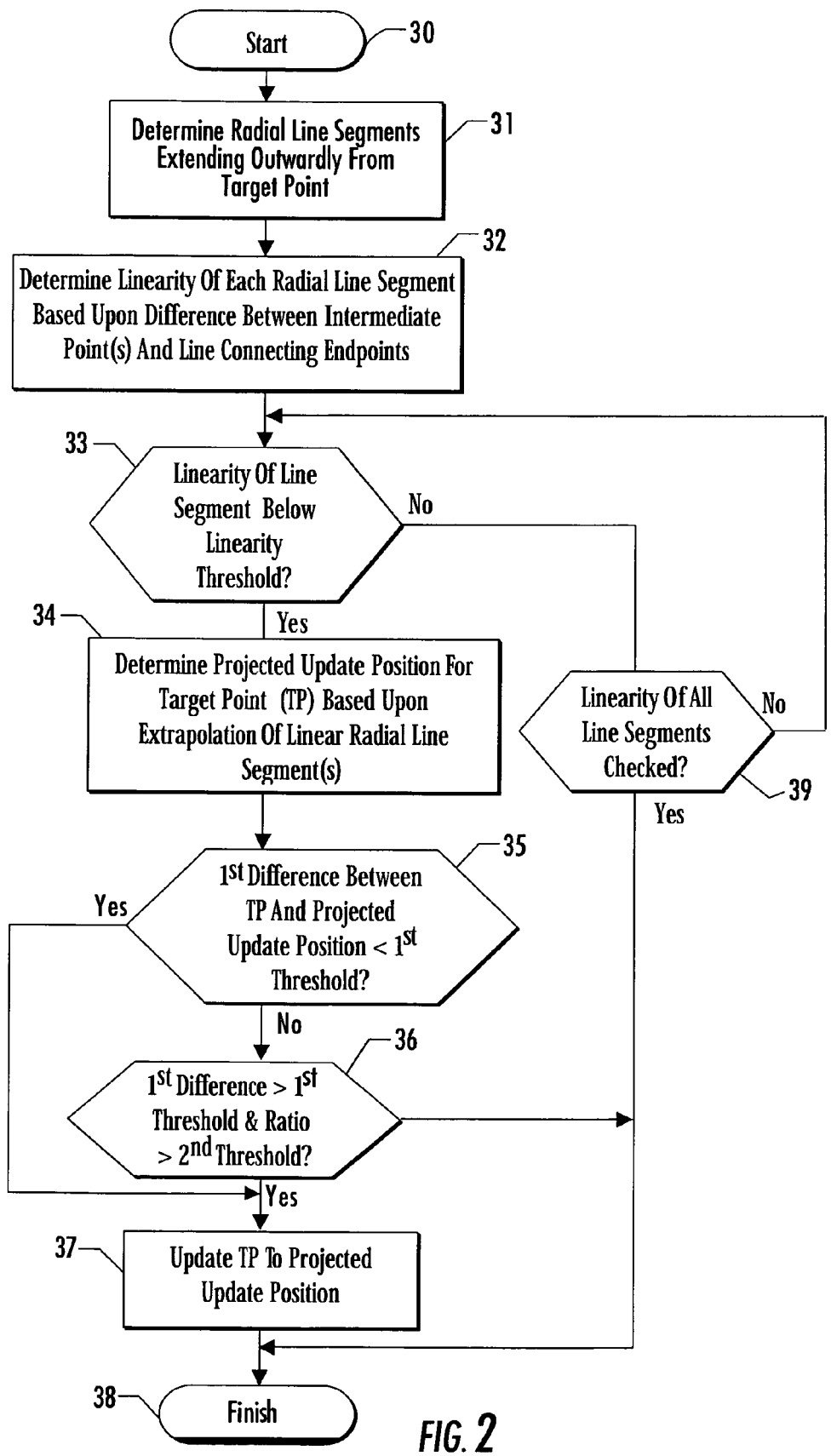
FIG. 2 is a flow diagram of a geospatial modeling method in accordance with the invention.

Referring initially to FIG. 1, a geospatial modeling system 20 illustratively includes a geospatial model database 21 and a processor 22. By way of example, the processor 22 may be a central processing unit (CPU) of a PC, Mac, or other computing workstation, for example. A display 23 may also be coupled to the processor 22 for displaying geospatial modeling data, as will be discussed further below. The processor 22 may be implemented using a combination of hardware and software components to perform the various operations that will be discussed further below, as will be appreciated by those skilled in the art.

By way of example, the geospatial data may be captured using various techniques such as stereo optical imagery, Light Detecting and Ranging (LIDAR), Interferometric Synthetic Aperture Radar (IFSAR), etc. Generally speaking, the data will be captured from overhead (e.g., nadir) views of the geographical area of interest by airplanes, satellites, etc., as will be appreciated by those skilled in the art. However, oblique images of a geographical area of interest may also be used in addition to or instead of the nadir images to add additional 3D detail to a geospatial model. The raw image data captured using LIDAR, etc., may be processed upstream from the geospatial model database 21 into a desired format, such as a digital elevation model (DEM), or this may be done by the processor 22.

Figure 3:
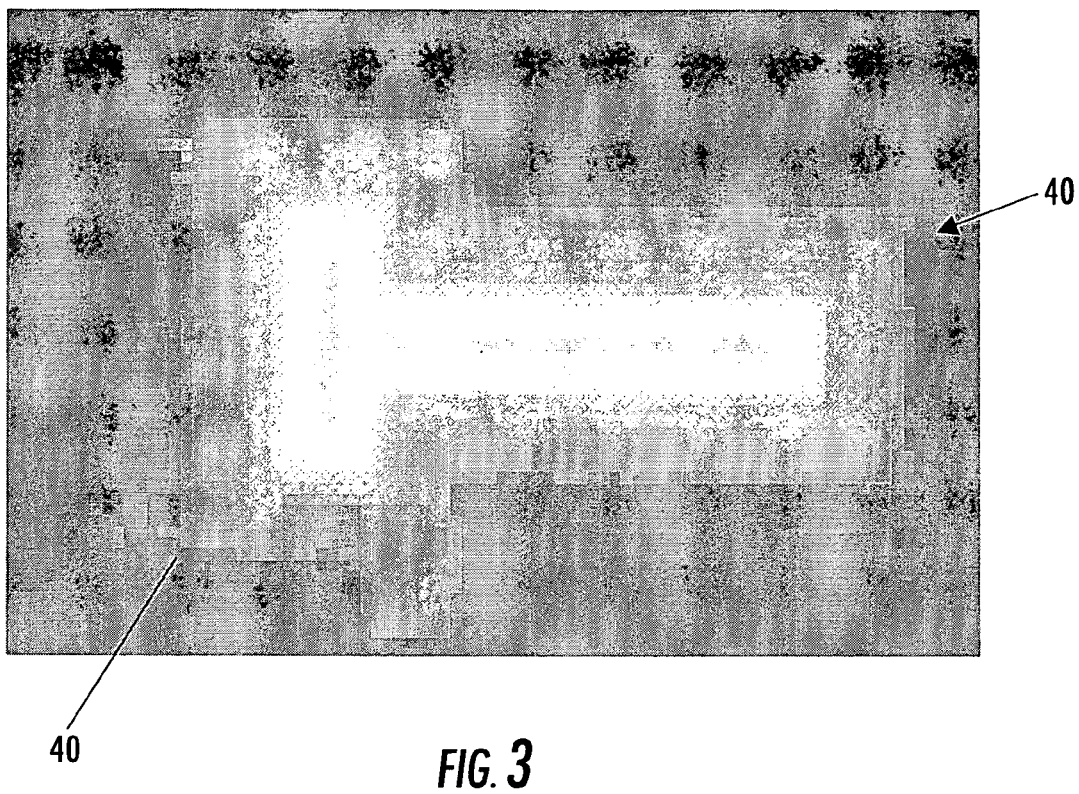
FIG. 3 is a DEM illustrating noise at the edges of a building due to a high image capture resolution

Moreover, the processor 22 cooperates with the geospatial model database 21 to filter the geospatial model data (e.g., DEN data) stored therein. As noted above, the relatively high resolutions (i.e., greater than one meter) now possible with LIDAR and other geospatial data capture devices can result in noisy regions within a geospatial model image produced thereby, particularly in and around boundary or transition regions. Referring to FIG. 3, for example, a DEM of a building 40 generated from LIDAR data has rows of noise posts 41 around the edge of the building as shown. The noise posts 41 typically occur at vertical edges of buildings or other cultural features due to mixed LIDAR returns from the building top, sides and ground, for example.

Figure 4:
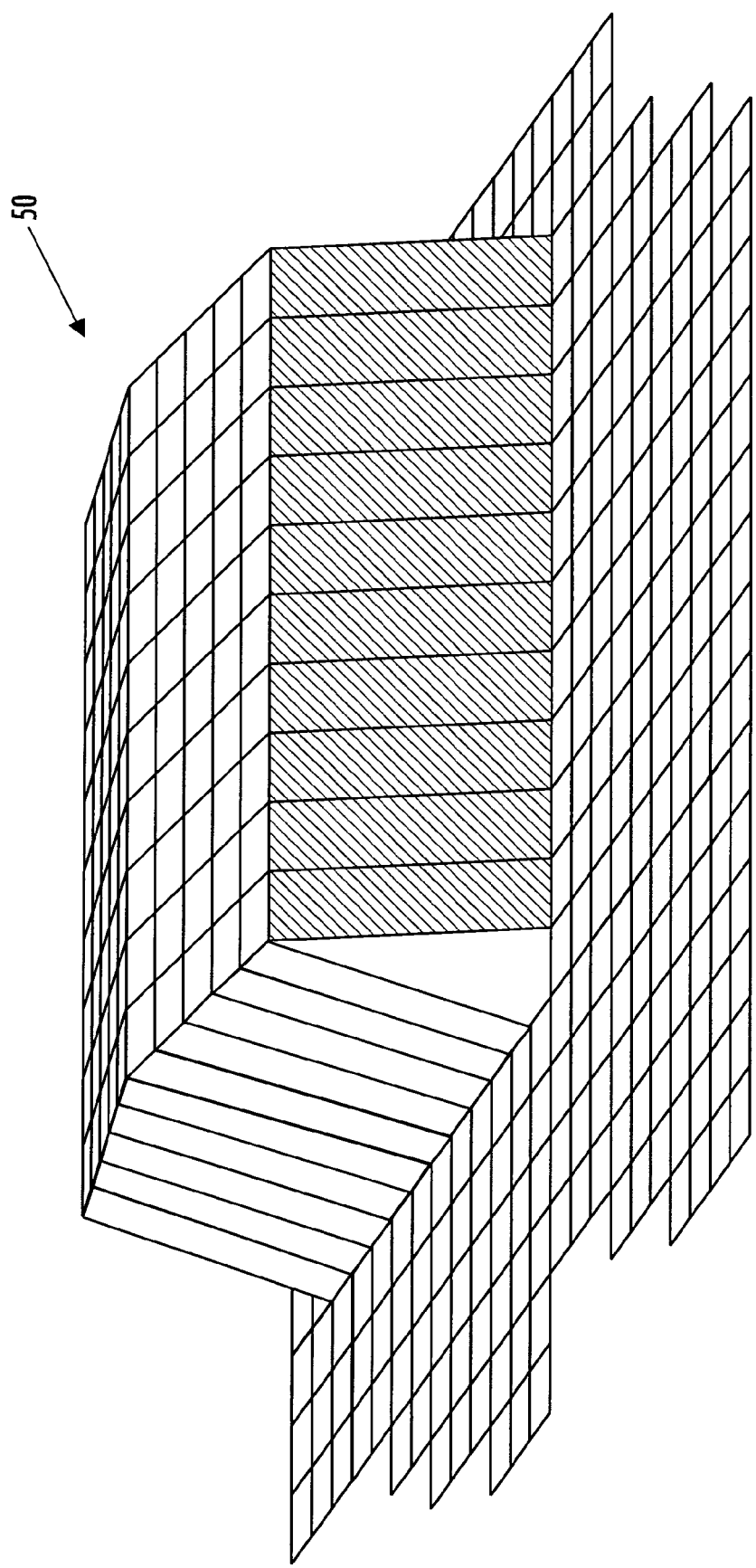
FIG. 4 is a simulated DEM view of a building that would ideally be generated from LIDAR, TFSAR, image stereo correlation, or other data sources.
Figure 5:
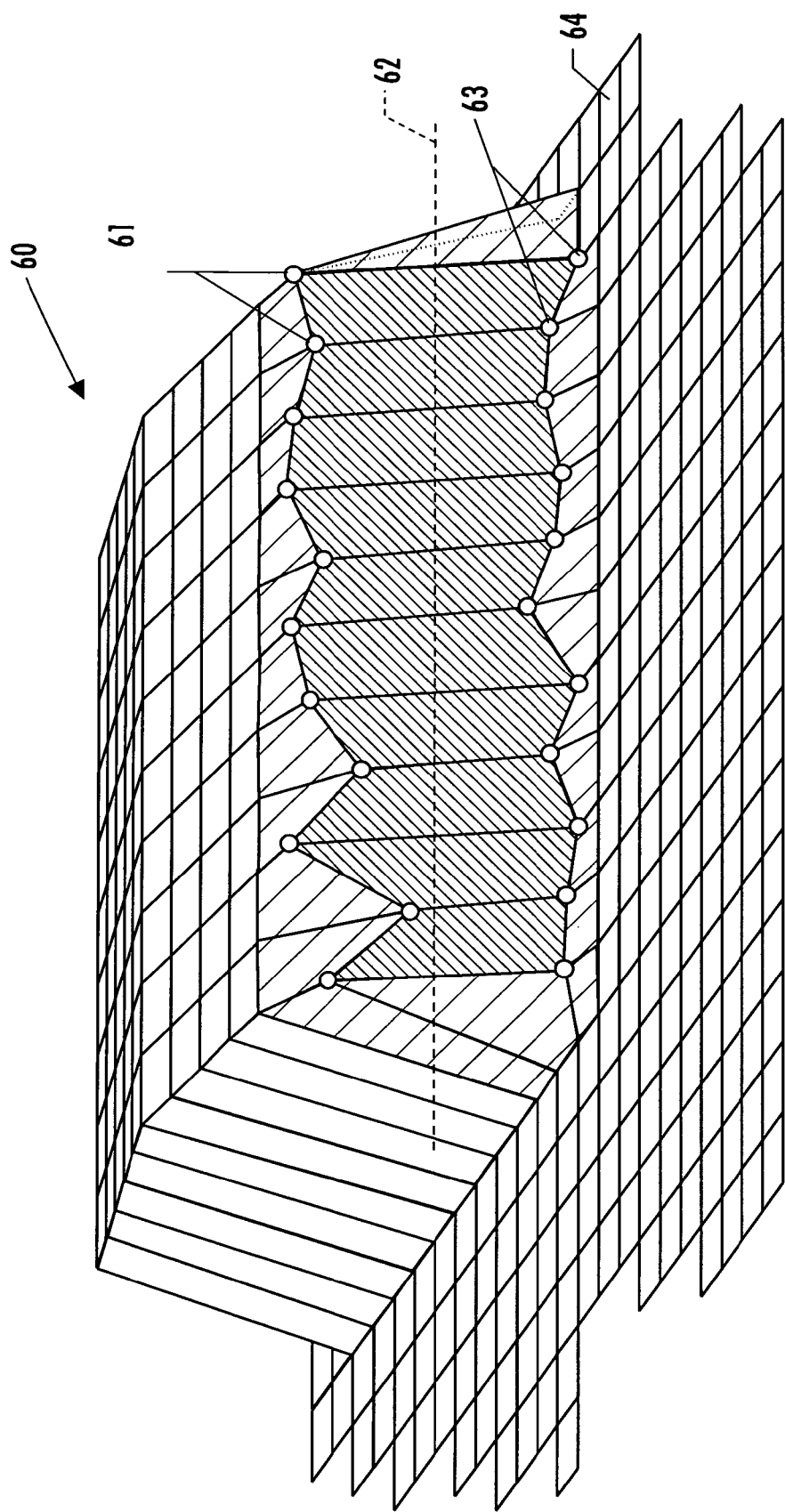
FIG. 5 is a simulated ideal, noise free DEM view of the building of FIG. 4 more closely approximating how the building would be rendered due to the effects of noise.

This phenomena will be further understood with reference to the simulated DEN representations of buildings 50 and 60 in FIGS. 4 and 5. More particularly, the simulated representation of the building 50 is an ideal case with crisp, straight vertical boundary (i.e., roof) delineations as one would desire to have automatically generated using a processor from raw LIDAR image data. However, because of the above-described noise, a typical DEN generated using standard DEM generation processes will look more like the building 60 shown in FIG. 5. That is, from comparison to the ideal building 50, it will be seen that several points 61 above a midline 62 of the building should be moved upward to make a linear boundary edge. Furthermore, other points 63 below the midline 62 should be moved downward to provide the desired linear boundary with the ground 64.

While a user could manually select the points 61, 63 to be moved up or down, this process is labor intensive, especially for geospatial models of large urban areas, and therefore expensive. As such, it is desirable to have an automated process by which the processor 22 can determine which points need to be moved adjacent a vertical edge of a building. However, at the same time it is often desirable to leave some features in an image unmodified, such as foliage, which is naturally "noisy" given the height and discontinuities associated therewith, as will be appreciated by those skilled in the art.

As such, the processor 22 advantageously filters, or "smoothes", such data points by selectively updating target points based upon adjacent points lying along a plurality of radial line segments extending outwardly from the each target point. More particularly, a method for filtering geospatial model data is now described with reference to FIGS. 2 and 6-12. Beginning at Block 30, for a given target point (or post) $P_c$ (e.g., one of the points 61 along the roof of the building 60) the processor 22 determines a plurality of radial line segments 71 extending outwardly from the target point.

Figure 6A:
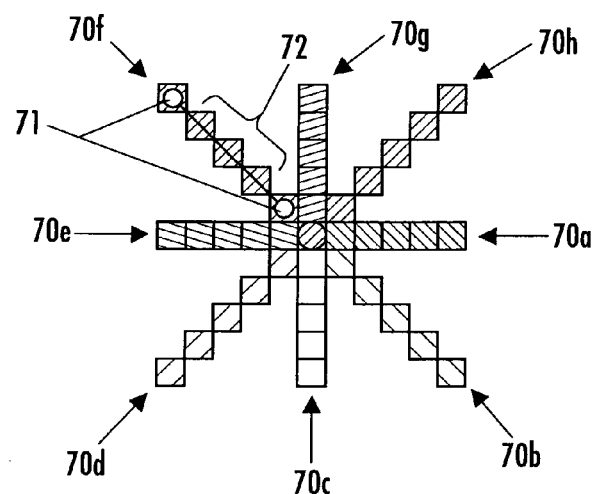
FIGS. 6A-6C are illustrations of radial line segments for use in target point filtering for segments of 5, 4, and 3 points, respectively.
Figure 6B:
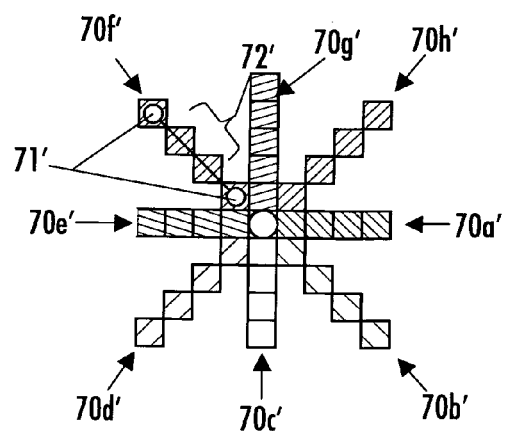
Figure 6C:
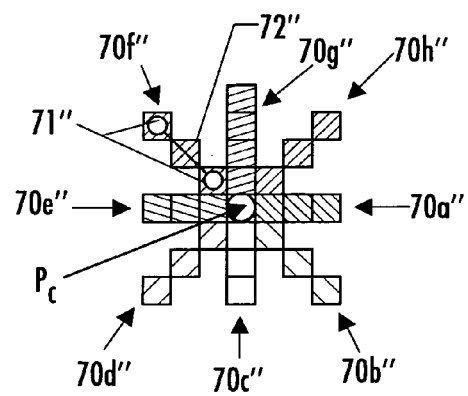
Figure 7:
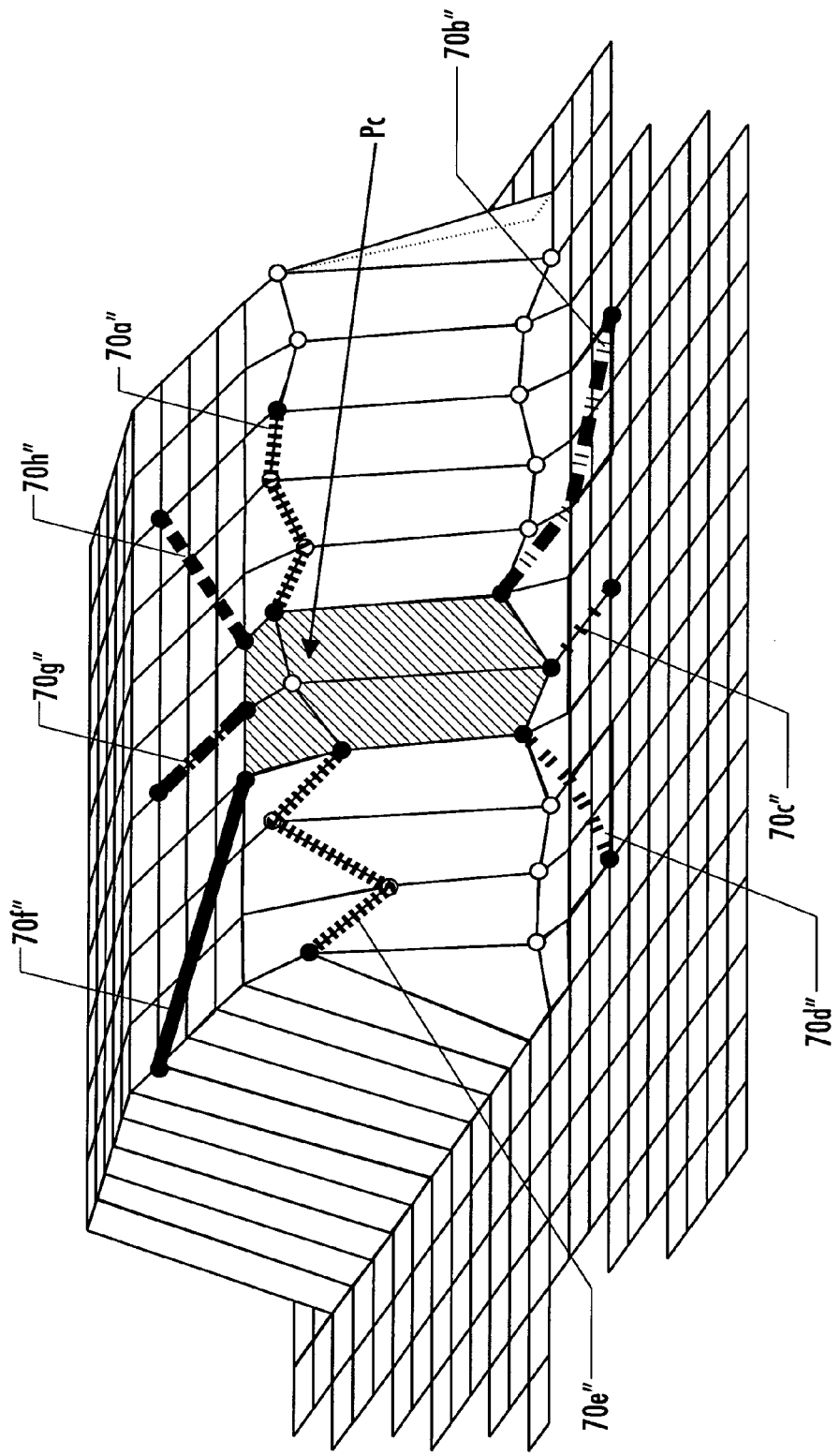
FIGS. 7-8 are simulated DEM views of the building of FIG. 5 illustrating filtering using radial line segments in accordance with the present invention.

By way of example, the plurality of radial line segments may be eight in number, as shown in FIGS. 6A-6C That is, the line segments occur 45° apart from one another, and may conceptually be viewed as extending up, down, left, right, and on corner diagonals from the target point $P_c$ in the 2D drawings of FIGS. 6A-6C. Furthermore, each radial line segment may include N points wherein N is five (FIG. 6A), four (FIG. 6B), or three (FIG. 6C). However, different numbers of points may be used in the radial line segments 70 in different embodiments.

Figure 10:
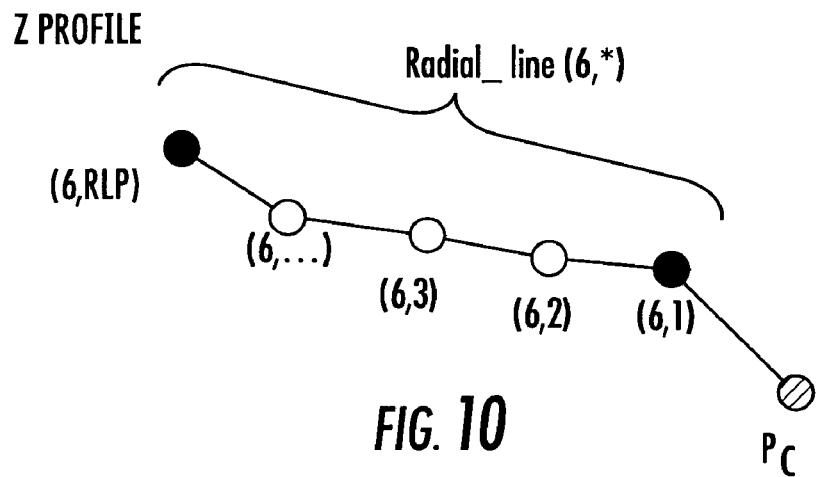
Figure 11:
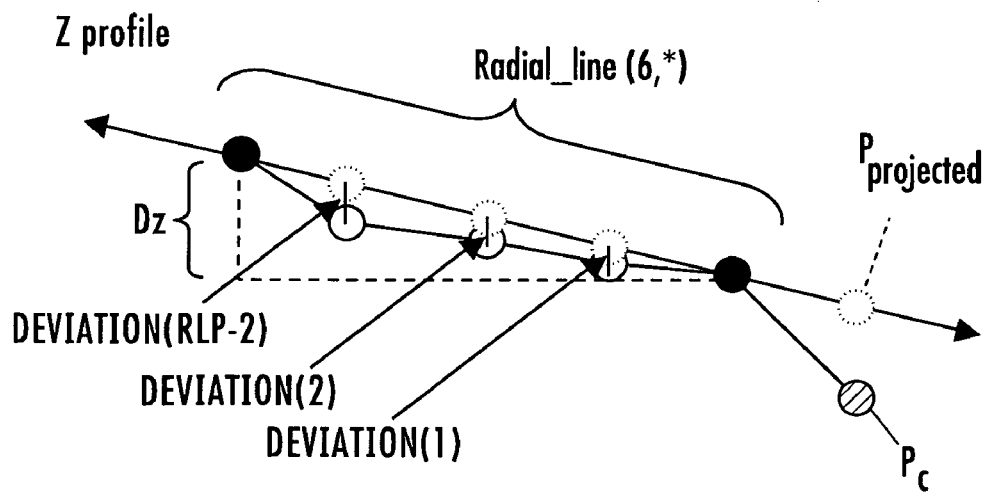

The processor 22 determines the linearity of each radial line segment 70 based upon a difference between the intermediate point(s) 72 and a line connecting the end points, at Block 32. An example of such a linearity determination is shown in FIGS. 9-11. For a radial line (6,*), the x-y profile is shown in FIG. 10, while the z profile of the points in the line (6,1) ... (6,RLP) is shown in FIGS. 10-11, where (6,1) is the proximal end point of the radial line, and (6,RLP) is the distal end point of the line. The deviation in the z profile from a straight line connecting the endpoints (6,1), (6,RLP) is shown in FIG. 11.

For a one meter post spacing in a DEM, for example, a general nonlinearity threshold may be expressed as follows:

$$\text{Nonlinearity}_{th} = K(RLP-2), \quad (1)$$

where K is the permitted vertical deviation of each point in meters. Using a default value of K=1 meter, for example, allows a ±1 meter vertical deviation of each intermediate point 72. Relatively small values of K (e.g., close to 0) may adjust few points, while relatively large values of K may adjust more points than desired. Accordingly, the appropriate value of K for a given application may vary depending upon the post spacing and the desired filtering results, as will be appreciated by those skilled in the art.

The vertical distance $D_z$ between the endpoints (6,1) and (6,RLP) (FIG. 11) is:

$$D_z = \text{Radial\_line}(*,RLP) - \text{Radial\_line}(*,1). \quad (2)$$

Accordingly, the following nonlinearity equation may be used for determining whether a linearity of a given target point $P_c$ is below the above-noted linearity threshold:

$$\text{Nonlinearity} = \Sigma_{i=1.RLP-2} abs(\text{Radial\_line}(*,1)+(D_z*i)/(RLP-1) - \text{Radial\_line}(*,i+1)). \quad (3)$$

If the linearity of a given line segment 70 is below the linearity threshold (i.e., the line segment is too nonlinear), then the processor 22 does not update the target point $P_c$ based upon that given line segment, at Block 33. If none of the radial line segments 70 has a linearity below the linearity threshold, at Block 39, then no updates are made to the target point $P_c$ at all, thus concluding the method illustrated in FIG. 2, at Block 38. That is, the target point $P_c$ is output without change. During an actual filtering operation, the processor 22 would then move to the next target point $P_c$ and repeat the illustrated filtering steps until all target points have been processed, as will be appreciated by those skilled in the art.

Figure 12:
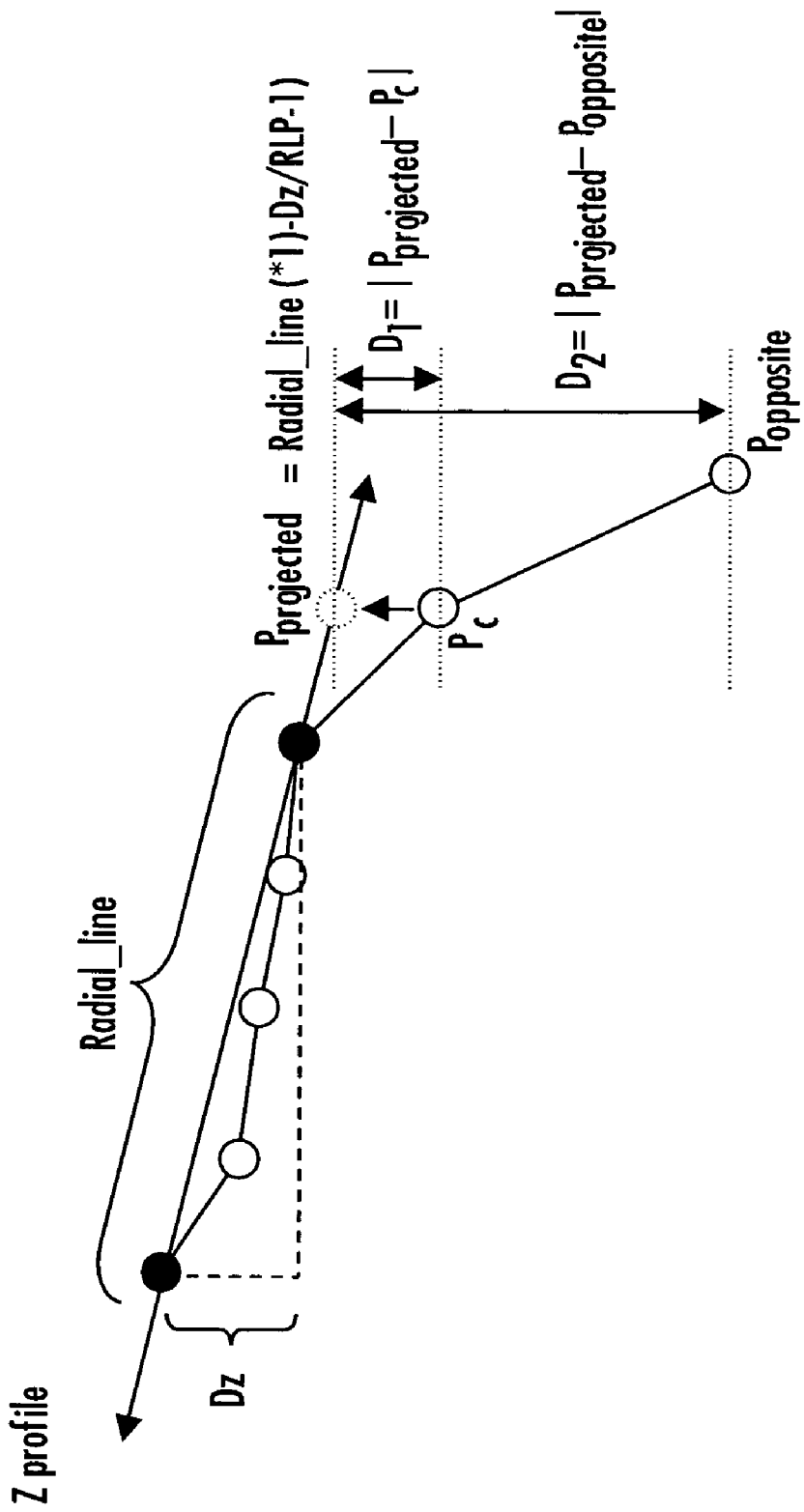

On the other hand, if the linearity of one or more of the radial line segments 70 is determined to be below the linearity threshold set forth in (1) above, then the processor 22 determines a projected update position $P_{projected}$ for the target point $P_c$ based upon an extrapolation of one or more of the radial line segments. In the example shown in FIG. 8, only the radial line segments 70f'', 70g'', and 70h'' meet this criteria. The extrapolation process for a given radial line segment (6,*) is shown in FIGS. 11 and 12. The 22 processor extends the line connecting the endpoints 71, and then determines where the target point $P_c$ intersects the line in the z direction as shown, which provides the projected update position $P_{projected}$.

Figure 8:
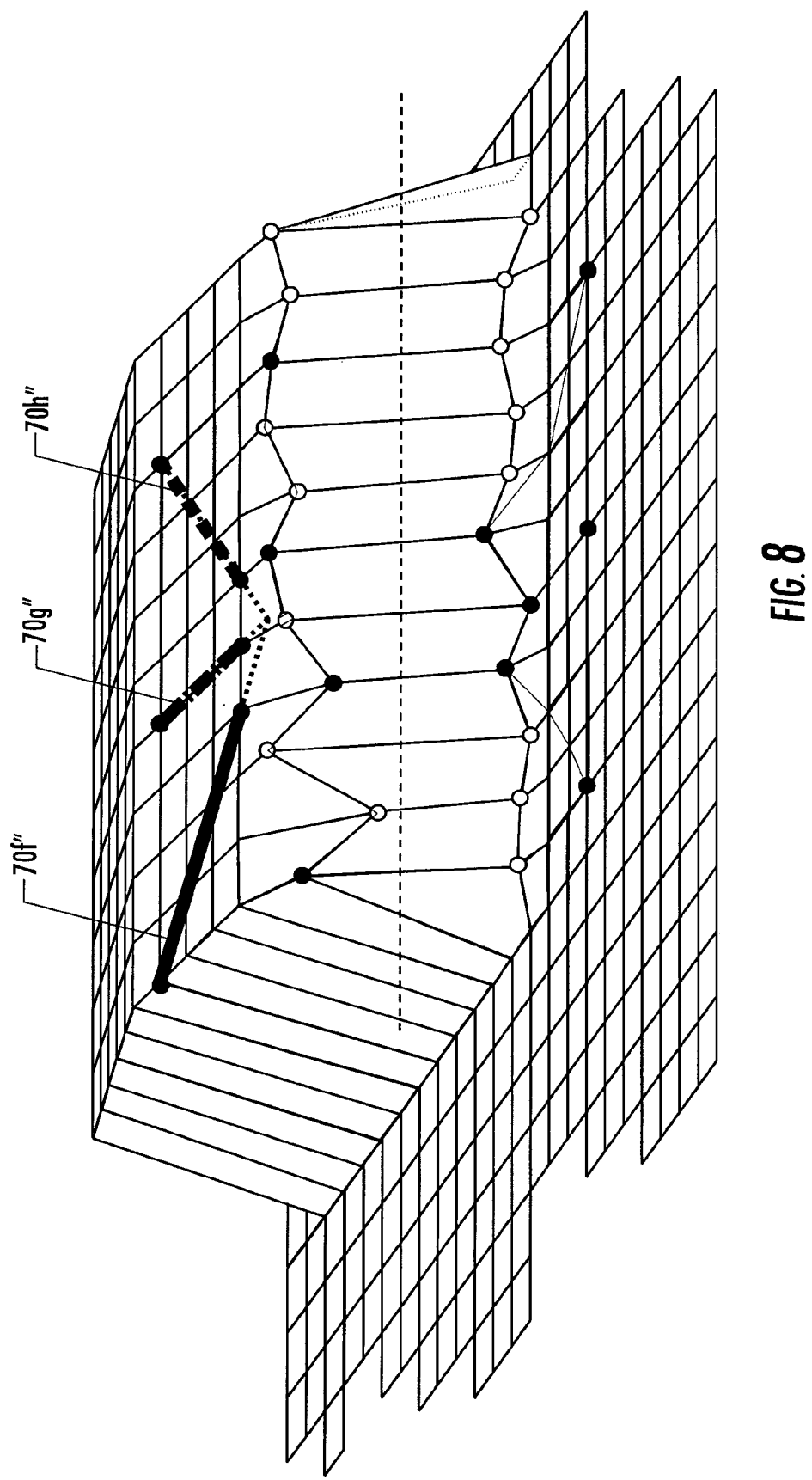

As noted above, the processor 22 may use more than one projected update position $P_{projected}$ in determining whether to update the point. That is, the processor 22 may generate an average projected update position $P_{projected}$ based upon all of the projected update positions resulting from each of the radial line segments 70, as shown in FIG. 8. Another approach is to simply use the projected update position from the most linear radial line segment 70 of all the segments having a linearity below the linearity threshold.

In either case, once the projected update position $P_{projected}$ is determined, the processor 22 then determines whether a first difference $D_1$ between the target point $P_c$ and the projected update position is less than a first threshold, at Block 35. More particularly, the first difference $D_1$ may be equal to the absolute value of the difference between the target point $P_c$ and the projected update position $P_{projected}$. If so, then the target point $P_c$ is updated to the projected update position $P_{projected}$, at Block 37. By way of example, the first threshold may be the value K, which in the present example is one meter, although other values may also be used depending upon the given embodiment and resolution being used.

On the other hand, if the first difference $D_1$ is not less than a first threshold, the then processor 22 determines whether a ratio of a second difference $D_2$ between an opposite point $P_{opposite}$ from the given radial line segment 70 and the projected update position $P_{projected}$ and the first difference is above a second threshold (FIG. 12), at Block 36. The second difference $D_2$ may be equal to the absolute value of the difference between the projected update position $P_{projected}$ and the opposite point $P_{opposite}$. More particularly, if the first distance $D_1$ is greater than the first threshold (K), then the projected update position $P_{projected}$ is output for the target point $P_c$ if the second distance $D_2$ is greater than twice first the distance $D_1$ (Block 37). In other words, if $D_1 > K$, then $P_c = P_{projected}$ only if $D_2 > 2*D_1$.

Figure 13:
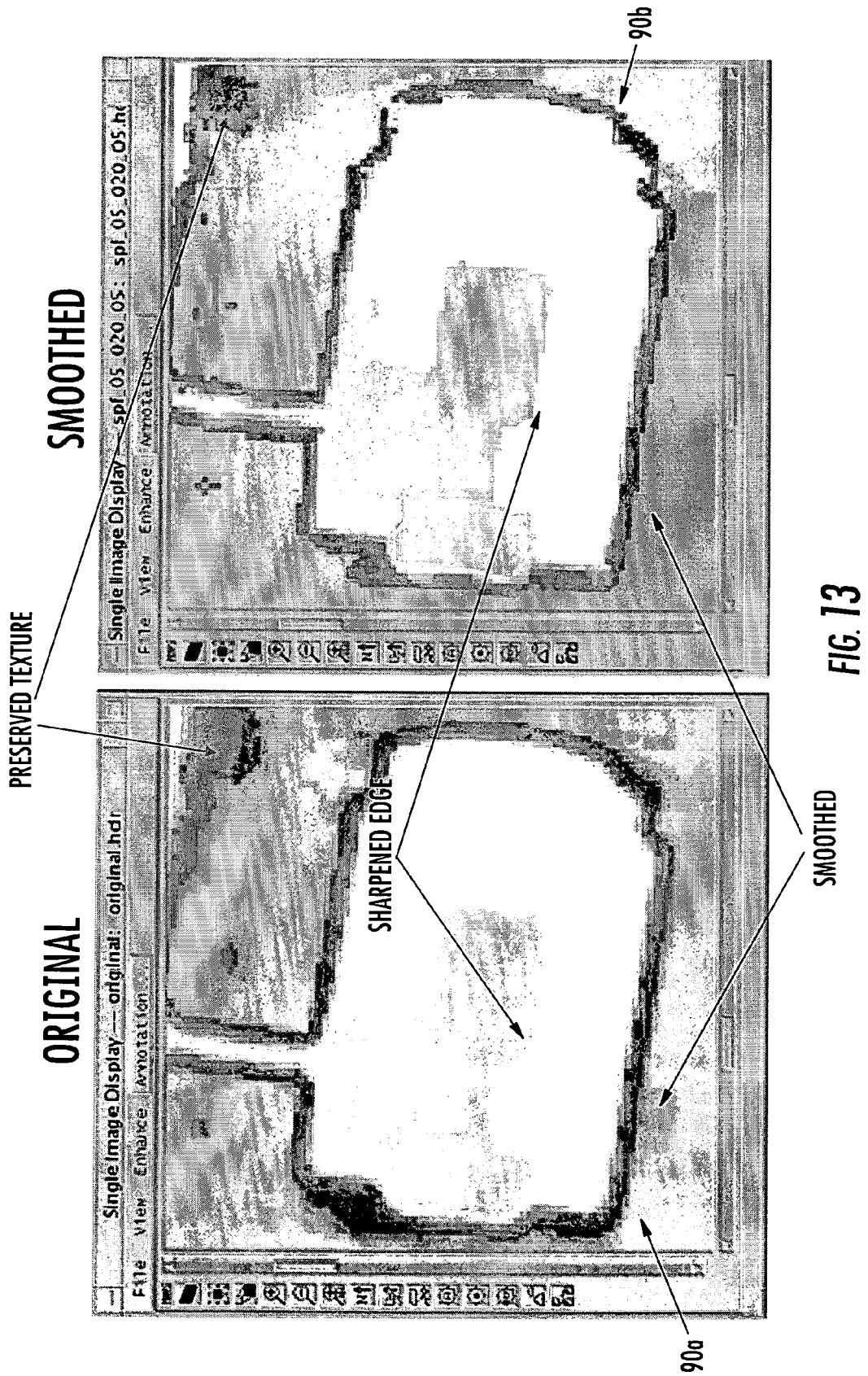
FIG. 13 is a pair of data images of a building before and after filtering using radial line segment filtering in accordance with the invention.

The results of the above-described filtering approach may be seen with reference to FIG. 13. In this example, original unfiltered data of a building 90a is shown on the left screen print. As can be seen, the transition or boundary edges of the building 90a appear blurry due to noise. The same building 90b is shown in the screen print on the right side of FIG. 13 after filtering using the above-described approach. Here it may be seen that the edge portions of the building 90a and its roof have been significantly smoothed, i.e., the delineations are crisper. Yet, the texture of the foliage in the upper right hand corner of the image is substantially preserved through this automated approach.

The above-described approach thus provides significant advantages in geospatial image data filtering. For example, the use of the linearity of radial lines helps preserve the straightest slopes of walls, roofs, ground, etc. Moreover, the use of a linearity tolerance helps prevent the smoothing of foliage and other areas that are naturally noisy In addition, the use of a height shift tolerance also helps prevent the reduction of walls into hills, for example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
   a geospatial model database; and
   a processor cooperating with said geospatial model database for filtering geospatial model data by selectively updating a target point based upon adjacent points lying along a plurality of radial line segments extending outwardly from the at least one target point.

2. The geospatial modeling system of claim 1 wherein said processor determines a linearity of each radial line segment.

3. The geospatial modeling system of claim 2 wherein said processor does not update the at least one target point if the linearity of each radial line segment is below a linearity threshold.

4. The geospatial modeling system of claim 2 wherein each radial line segment comprises a pair of end points and at least one intermediate point therebetween; and wherein said processor determines the linearity of each radial line segment based upon a difference between the at least one intermediate point and a line connecting the end points.

5. The geospatial modeling system of claim 1 wherein said processor determines a projected update position for the at least one target point based upon an extrapolation of at least one linear radial line segment.

6. The geospatial modeling system of claim 5 wherein said processor updates the target point to the projected update position if a first difference between the target point and the projected update position is less than a first threshold.

7. The geospatial modeling system of claim 6 wherein said processor updates the target point to the projected update position if the first difference is greater than the first threshold and a ratio of a second difference between an opposite point from the at least one radial line segment and the projected update position and the first difference is above a second threshold.

8. The geospatial modeling system of claim 1 wherein each radial line segment comprises N points wherein N is greater than or equal to three.

9. The geospatial modeling system of claim 1 wherein the geospatial model data comprises a digital elevation model (DEM).

10. A geospatial modeling system comprising:
a geospatial model database; and
a processor cooperating with said geospatial model database for filtering geospatial model data by selectively updating a target point based upon adjacent points lying along a plurality of radial line segments extending outwardly from the at least one target point;
said processor selectively updating the target point by determining a linearity of each radial line segment, and determining a projected update position for the at least one target point based upon an extrapolation of at least one linear radial line segment.

11. The geospatial modeling system of claim 10 wherein said processor does not update the at least one target point if the linearity of each radial line segment is below a linearity threshold.

12. The geospatial modeling system of claim 10 wherein each radial line segment comprises a pair of end points and at least one intermediate point therebetween; and wherein said processor determines the linearity of each line segment based upon a difference between the at least one intermediate point and a line connecting the end points.

13. The geospatial modeling system of claim 12 wherein said processor updates the target point to the projected update position if a first difference between the target point and the projected update position is less than a first threshold, or if the first difference is greater than the first threshold and a ratio of a second difference between an opposite point from the at least one radial line segment and the projected update position and the first difference is above a second threshold.

14. A geospatial modeling method comprising:
providing geospatial model data; and
filtering the geospatial model data using a processor to selectively update a target point based upon adjacent points lying along a plurality of radial line segments extending outwardly from the at least one target point.

15. The method of claim 14 wherein filtering further comprises using the processor to determine a linearity of each radial line segment.

16. The method of claim 15 wherein the processor does not update the at least one target point if the linearity of each radial line segment is below a linearity threshold.

17. The method of claim 15 wherein each radial line segment comprises a pair of end points and at least one intermediate point therebetween; and wherein filtering further comprises using the processor to determine the linearity of each line segment based upon a difference between the at least one intermediate point and a line connecting the end points.

18. The method of claim 14 wherein the filtering further comprises using the processor to determine a projected update position for the at least one target point based upon an extrapolation of at least one linear radial line segment.

19. The method of claim 18 wherein the processor updates the target point to the projected update position if a first difference between the target point and the projected update position is less than a first threshold.

20. The method of claim 19 wherein the processor updates the target point to the projected update position if the first difference is greater than the first threshold and a ratio of a second difference between an opposite point from the at least one radial line segment and the projected update position and the first difference is above a second threshold.

21. A computer-readable medium having computer-executable modules comprising:
a geospatial model database module; and
a processing module cooperating with the geospatial model database for filtering geospatial model data by selectively updating a target point based upon adjacent points lying along a plurality of radial line segments extending outwardly from the at least one target point.

22. The computer-readable medium of claim 21 wherein the processor determines a linearity of each radial line segment.

23. The computer-readable medium of claim 22 wherein the processor does not update the at least one target point if the linearity of each radial line segment is below a linearity threshold.

24. The computer-readable medium of claim 22 wherein each radial line segment comprises a pair of end points and at least one intermediate point therebetween; and wherein the processor determines the linearity of each radial line segment based upon a difference between the at least one intermediate point and a line connecting the end points.

25. The computer-readable medium of claim 21 wherein the processor determines a projected update position for the at least one target point based upon an extrapolation of at least one linear radial line segment.

26. The computer-readable medium of claim 25 wherein the processor updates the target point to the projected update position if a first difference between the target point and the projected update position is less than a first threshold, or if the first difference is greater than the first threshold and a ratio of a second difference between an opposite point from the at least one radial line segment and the projected update position and the first difference is above a second threshold.

* * * * *